Dec. 16, 1930.   A. D. MAURY   1,785,279
BRAKE FOR AUTOMATIC REELS
Filed April 14, 1927    2 Sheets-Sheet 1
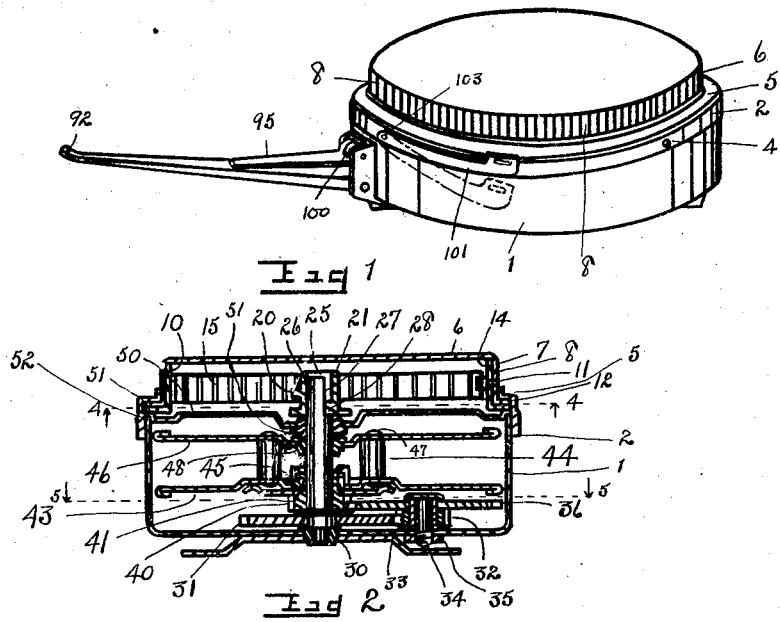
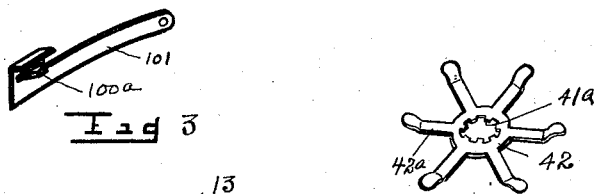
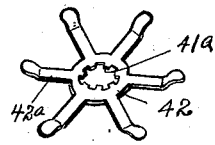
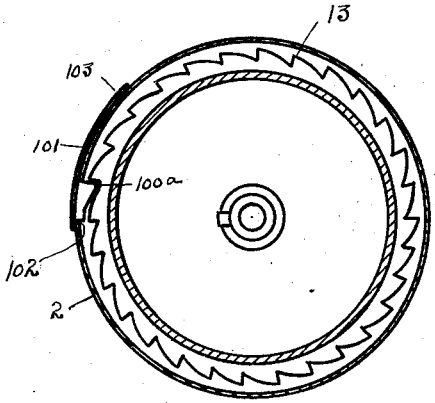
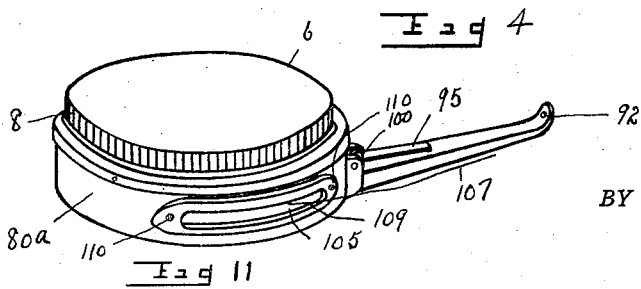
INVENTOR
Alfred D. Maury
BY
Thomas L. Wilder
ATTORNEY Dec. 16, 1930.   A. D. MAURY   1,785,279
BRAKE FOR AUTOMATIC REELS
Filed April 14, 1927   2 Sheets-Sheet 2
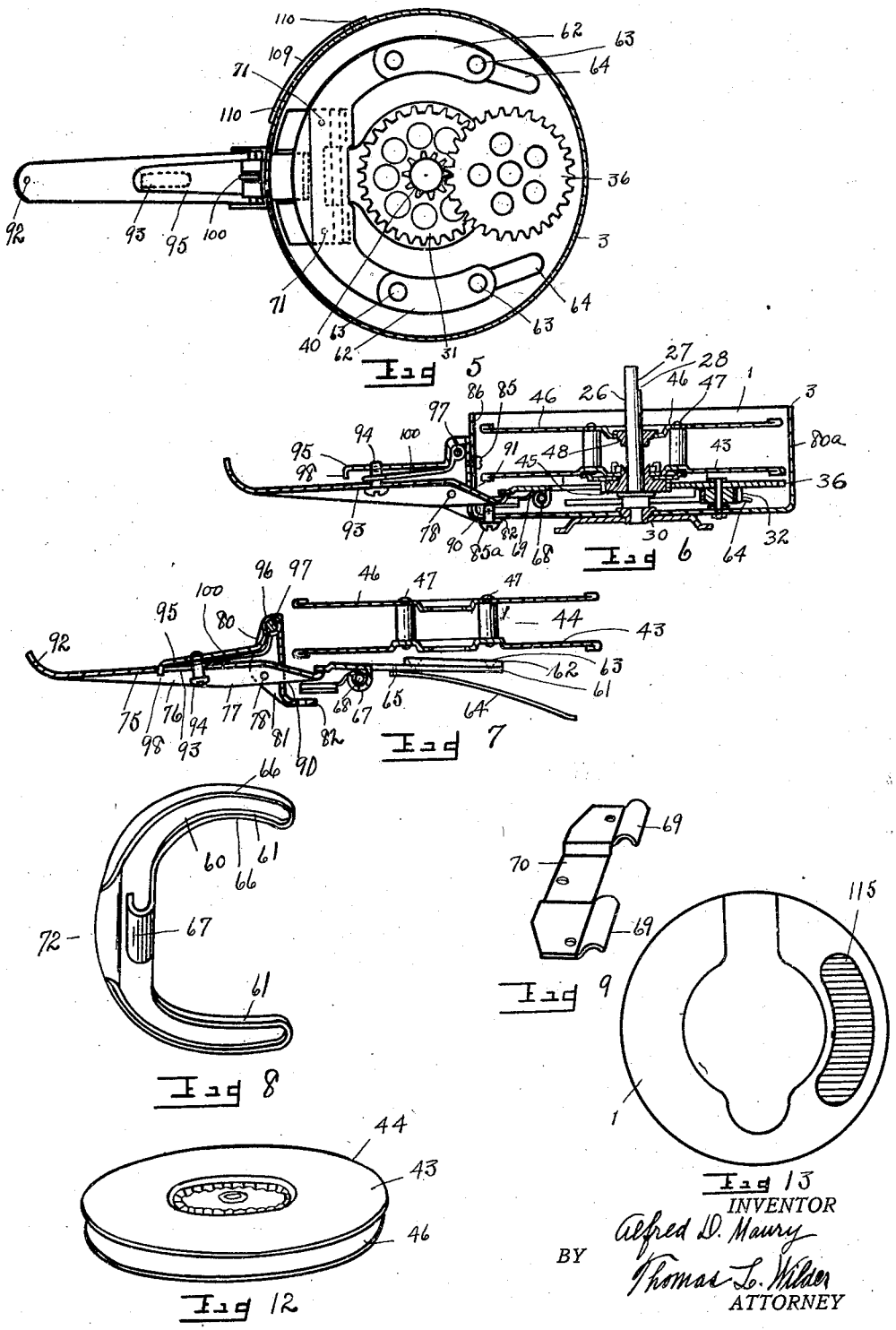
INVENTOR
Alfred D. Maury
BY
Thomas L. Wilder
ATTORNEY Patented Dec. 16, 1930

1,785,279

UNITED STATES PATENT OFFICE

ALFRED D. MAURY, OF ILION, NEW YORK, ASSIGNOR TO MARTIN AUTOMATIC FISHING REEL COMPANY, INCORPORATED, A CORPORATION OF NEW YORK

BRAKE FOR AUTOMATIC REELS

Application filed April 14, 1927. Serial No. 183,877.

My invention relates to a brake for automatic reels and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a brake for automatic reels that will have an extensive braking surface whereby to prolong the life thereof. Moreover, the brake is constructed in two main parts to insure a more perfect action of the brake.

The object of the invention will be disclosed by referring to the drawings, in which:

Fig. 1 is a perspective view of an automatic reel;

Fig. 2 is a central vertical section of the automatic reel the brake and operating means therefore being omitted;

Fig. 3 is a detail perspective view of a ratchet employed;

Fig. 4 is a section view taken on the line 4, 4 of Fig. 2 and looking in the direction of the arrows indicated;

Fig. 5 is a section view taken on the line 5, 5 of Fig. 2 and looking in the direction of the arrows;

Fig. 6 is a central vertical section showing the brake in locked position, parts being removed;

Fig. 7 is a central vertical section showing the brake in open position, parts being removed;

Fig. 8 is a detail perspective view somewhat enlarged of the braking member looking at the under side thereof;

Fig. 9 is a detail perspective view of a bracket employed;

Fig. 10 is a detail perspective view of a spider employed.

Fig. 11 is a perspective view of the reel drawn on a somewhat smaller scale and showing the aperture for the passage of the fishing line from the spool in the reel to the fishing pole.

Fig. 12 is a perspective view of a spool employed looking at the underside thereof.

Fig. 13 is a plan view of the bottom surface of the casing of the reel.

Referring more particularly to the drawings, the invention embodies a casing 1 provided with an annular ring 2 adapted to slip over the upper peripheral edge 3 of casing 1 and to be held thereto by three screws 4. Ring 2 has an annular shoulder at 5, whereby to aid in holding rotatable cap piece 6 in assembled position. Cap piece 6 is made in two parts. An outer part 7 having a serrated surface at 8 to aid in its rotation and an inner fitting annular ring 10 that is fixed to turn with outer part 7 by rivet 11. The lower free edges of parts 7 and ring 10 are bent at right angles, as at 12 and formed with ratchet teeth 13.

The inner end of rivet 11 is formed into a hook that projects beyond wall 14, whereby it is adapted to engage one end of a coiled flat spring 15 housed in said cap piece 6. The other end of coiled spring 15 engages a lug 20 formed integral with hub cap 21.

Hub cap 21 has a central recess 25 provided with one flat surface to fit upon and turn with central shaft 26. Shaft 26 is provided also with a flat surface at 27 to correspond with the flat surface of cap 21. A shoulder at 28 limits the lowermost position of cap 21, on said shaft 26.

The lower end of shaft 26 has a bearing in journal 30 rigidly mounted to casing 1. A spur gear 31 is carried by the lower end of shaft 26, in a manner to turn therewith. Gear 31 meshes with a pinion 32 mounted to turn freely on a flanged or headed sleeve 33 disposed upon headed screw bolt 34 that is secured to casing 1 by nut 35.

Pinion 32 has superimposed to turn therewith on bolt 34, as an axis, a spur gear 36 adapted to mesh with pinion 40 mounted on central shafts 26 in a manner to turn independently thereof. Pinion 40 is shouldered at 41 and has teeth adapted to mesh with teeth 41a on spider 42 whereby to turn therewith. Spider 42 has six arms 42a radiating from the center. The ends of arms 42a are bent upwards and adapted to make contact with a serrated or corrugated under surface of lower plate 43 of spool 44 whereby spool 44 will turn normally with pinion 40, although they may slip past each other under cases of great strain.

The upper part of the hub of pinion 40 is reduced still further to form a shoulder at 45 for mounting lower plate 43 of line spool 44. Upper plate 46 of spool 44 is spaced from lower plate 43 by spacing rivets 47. Upper plate 46 carries a hub 48 forming a journal or hub for central shaft 26.

A cover plate 50 provided with hub 51 for the free rotation of central shaft 26 is mounted above spool 44. Plate 50 is formed with a peripheral shoulder 51a adapted to rest upon the upper peripheral edge 3 of casing 1.

There is a horseshoe shaped brake member 60. Arms 61, 61 of brake member 60 are concentric with the annular interior of casing 1. Leather or other suitable strips or pads 62, 62 are fastened to the upper surface of arms 61 by rivets 63 engaging apertures made in arms 61. Said leather strips 62 are adapted to make contact with the under surface of plate 43 of line spool 44, whereby to effect a friction brake thereon. Arms 61 with leather strips 62 thereon are held yieldingly in contact with the under surface of plate 43 by flat springs 64, 64 disposed beneath said arms 61 in each instance. The lower end of each of said springs 64 rests on the inner lower surface of casing 1. The upper end engages between the depending flanges 66, 66 of brake member 60 and is fastened thereto by a rivet 65.

A depending socket member 67 is formed on the forward under surface of brake member 60. Socket member 67 is adapted to engage a shaft 68 and is held therein by bearings 69, 69 of bracket 70 that is fastened to casing 1 by screw bolts 71, 71, whereby said brake member 66 may rotate on said shaft 68, as a fulcrum. The forward end 72 of brake member 60 is offset or depressed and forms a flat surface adapted to be engaged by the inner upturned end of brake lever 75. Brake lever 75 is channeled at 76. Bearings are formed in flanges 77, 77 of the channeled portion of brake lever 75 for the projection of a shaft 78 carried in journals made in laterally projecting sides 80, 80 of bracket 81.

Bracket 81 is made with a part 82 disposed at right angles thereto, whereby to conform to the exterior of casing 1. It it attached to casing 1 by a screw 85 projecting through the vertical wall 86 of casing 1 and by screw 85a projecting upward from beneath through part 82 of bracket 81 and engaging casing 1 and bracket 70 as hereinabove explained. Bracket 81 has a recess 90 adapted to aline with a corresponding recess 91 made in wall 80a of casing 1 for the projection of the inner end of brake lever 75 to within casing 1 and beneath the forward end 72 of brake member 60.

Brake lever 75 has an aperture 92 at its outer end for the passage of a fishing line and an elongated aperture 93 near its middle portion for the projection of headed bolt 94 that is screw mounted to locking pawl 95. Locking pawl 95 has one end 96 coiled about shaft 97 carried by laterally projecting walls 80 of bracket 81. The opposite or free end 98 of pawl 95 is bent downwards and is adapted to engage elongated aperture 93 of brake lever 75, whereby to hold the same in releasing position.

The end 96 of locking pawl 95 is split in the center and recessed to provide room for the end of a spring 100 that is coiled also about shaft 97 and held rigidly thereto, shaft 97 being also rigid. Spring 100 conforms to the shape, in a longitudinal direction, of pawl 95. Its opposite end is coiled loosely about bolt 94 and exerts a pressure upward, whereby to force the free end 98 of pawl 95 normally upward.

The operation of the brake is effected by allowing the parts to be in the position illustrated in Figs. 2 and 6. In order to release the brake, however, a light pressure will be exerted on the outer end of brake lever 75. This will cause the rocking of brake member 60 into the position illustrated in Fig. 7. In order to lock brake lever 75 in this releasing position, a still further pressure on the outer end thereof will permit the free depending end 98 of pawl 95 to be pressed down into elongated aperture 93 against the pressure of spring 100 as shown in Fig. 7. Pawl 95 will be held in this position by frictional contact with the contiguous end of recess 93. A further push downward on the free end of brake lever 75 will release the end 98 of pawl 95 and cause it to fly upward under pressure of spring 100. Immediately pressure is withdrawn from brake lever 75, the same will return to normal position, as shown in Fig. 6, thereby withdrawing its pressure on the forward end 72 of locking member 60, which under the influence of springs 64 will return to engaging position with the under surface of spool 44 to stop the rotation thereof.

The invention embodies also a novel arrangement of a tooth 100a for engaging the teeth 13 of rotatable cap piece 6. Tooth 100a is formed or riveted to the outer free end of a spring 101 and projects through a suitable aperture 102 made in annular ring 2 to engage said teeth 13. The opposite end of spring 101 is fulcrumed by screw 103 to ring 2. In order to withdraw tooth 100a from engagement with teeth 13, whereby to allow spool 44 to turn freely in either direction, the operator will pick off the free end of spring 101 and rock it into dotted line position illustrated in Fig. 1.

An elongated aperture 105 is made in the side wall 80a of casing 1 for the passage of the fishing line 107 from spool 44 to fishing pole not shown. In order to protect said line 107 from abrasion or wear a hardened steel plate having a corresponding aperture with rounded edges 109 is held by screws 110 to said wall 80a.

The casing 1 is provided on its under surface with corrugations 115 for the purpose of scratching matches thereon. The fisherman will find this feature convenient when lighting his pipe.

Having thus described my invention what I claim as new and desire to secure by Letters Patent is:

1. In an automatic fishing reel, a rotary spool, a horseshoe shaped brake member having arms with leather strips thereon adapted to make contact with said spool for stopping the rotation of said spool, and a pivotally mounted lever to release said brake member.

2. In an automatic fishing reel, having a rotary spool, a pivotally mounted horseshoe shaped brake member adapted to stop the rotation of said spool, and a lever for rocking said brake member, whereby to permit the rotation of said spool.

3. In an automatic fishing reel having a rotary spool, a pivotally mounted horseshoe shaped brake member adapted to make contact with said spool, springs for holding said brake member yielding against said spool, and a pivotally mounted lever for rocking said brake member, whereby to permit the rotation of said spool.

4. In an automatic fishing reel having a rotary spool, yielding horseshoe shaped means adapted to make contact with said spool, whereby to stop the rotation thereof, a pivotally mounted lever for rocking said means, whereby to permit the rotation of said spool, and spring pressed means for locking said lever in given release position.

5. In an automatic fishing reel having a spring actuated rotatable spool, a horseshoe shaped locking member adapted to yieldingly engage said spool, whereby to stop the rotation thereof, a lever adapted to make contact with said locking member to move it into releasing position, and a pawl for holding said lever in said position.

In testimony whereof I affix my signature.

ALFRED D. MAURY.